US012612161B2

(12) United States Patent
Miles

(10) Patent No.: US 12,612,161 B2
(45) Date of Patent: Apr. 28, 2026

(54) TRANSFORMING LAVATORY DOOR

(71) Applicant: Airbus Operations GmbH, Hamburg (DE)

(72) Inventor: Tjark Miles, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/182,856

(22) Filed: Apr. 18, 2025

(65) Prior Publication Data

US 2025/0333170 A1 Oct. 30, 2025

(30) Foreign Application Priority Data

Apr. 29, 2024 (EP) ...................................... 24173071

(51) Int. Cl.
*B64D 11/02* (2006.01)
(52) U.S. Cl.
CPC ..................................... *B64D 11/02* (2013.01)
(58) Field of Classification Search
CPC ............................. B64D 11/02; B64D 11/0023
See application file for complete search history.

(56) References Cited

U.S. PATENT DOCUMENTS

| | | | | | |
|---|---|---|---|---|---|
| 4,589,463 | A | * | 5/1986 | Ryan | .......................... E06B 3/48 |
| | | | | | 296/156 |
| 6,007,025 | A | * | 12/1999 | Coughren | .............. B64D 11/02 |
| | | | | | 244/118.6 |
| 6,079,669 | A | | 6/2000 | Hanay et al. | |
| 7,152,257 | B2 | * | 12/2006 | Lasch | .................... E04H 1/1216 |
| | | | | | 52/64 |
| 8,944,377 | B2 | * | 2/2015 | McIntosh | ................ E03D 11/00 |
| | | | | | 244/118.5 |
| 9,045,231 | B2 | * | 6/2015 | Swain | .................... E06B 9/0638 |
| 9,308,997 | B2 | * | 4/2016 | Scown | .................... B64D 11/02 |

(Continued)

FOREIGN PATENT DOCUMENTS

| | | |
|---|---|---|
| EP | 0867365 A2 | 9/1998 |
| EP | 2711295 A2 | 3/2014 |

(Continued)

OTHER PUBLICATIONS

European Search Report for corresponding European Patent Application No. 24173071.2 dated Sep. 16, 2024.

*Primary Examiner* — Philip J Bonzell
(74) *Attorney, Agent, or Firm* — Greer Burns & Crain Ltd.

(57) ABSTRACT

An aircraft cabin lavatory with increased available space has a lavatory door including a door panel and an extension arrangement with at least one vertical extension segment. The door panel includes a hinge arrangement on one lateral side such that the door panel is movable around a main vertical axis between closed and opened positions. The vertical extension segment is movably mounted relative to the door panel around a subordinate vertical axis to be movable between stored and extended positions. The vertical extension segment is configured to be temporarily fixed in the stored position for a first use of the door panel. For a second use, the vertical extension segment is movable to the extended position when the door panel is in a partly opened position such that a vertically running gap between the door panel and a door frame is covered by the vertical extension segment.

15 Claims, 4 Drawing Sheets

(56) References Cited

U.S. PATENT DOCUMENTS

| | | | | |
|---|---|---|---|---|
| 9,561,854 | B2 * | 2/2017 | Schliwa | B64D 11/04 |
| 9,688,407 | B2 * | 6/2017 | McIntosh | B64D 11/02 |
| 11,878,802 | B2 * | 1/2024 | Scoley | E04H 1/125 |
| 11,958,609 | B2 * | 4/2024 | Brown | B64D 11/02 |
| 12,065,245 | B2 * | 8/2024 | Eisele | E04H 1/1266 |
| 12,168,516 | B2 * | 12/2024 | Ruiz Lara | B64D 11/02 |
| 12,312,087 | B2 * | 5/2025 | Clucas | B64D 11/02 |
| 2005/0125891 | A1 * | 6/2005 | Stratmann | E04H 1/1216 |
| | | | | 4/661 |
| 2013/0206907 | A1 * | 8/2013 | Burrows | B64D 11/02 |
| | | | | 244/118.5 |
| 2014/0077033 | A1 * | 3/2014 | Scown | B64D 11/02 |
| | | | | 49/70 |
| 2014/0083012 | A1 | 3/2014 | Boren et al. | |
| 2014/0123571 | A1 * | 5/2014 | Swain | B64D 11/0023 |
| | | | | 29/401.1 |
| 2014/0138483 | A1 | 5/2014 | Schliwa et al. | |
| 2014/0291446 | A1 * | 10/2014 | Reams | B64D 11/02 |
| | | | | 244/118.5 |
| 2014/0360099 | A1 * | 12/2014 | McIntosh | B64G 1/60 |
| | | | | 29/401.1 |
| 2015/0096118 | A1 * | 4/2015 | McIntosh | B64D 11/02 |
| | | | | 4/300 |
| 2016/0039522 | A1 | 2/2016 | Koyama et al. | |
| 2016/0069122 | A1 | 3/2016 | Tubbs | |
| 2018/0251222 | A1 * | 9/2018 | Banfield | E04H 1/1216 |
| 2021/0403165 | A1 * | 12/2021 | Scoley | B64D 11/02 |
| 2022/0212774 | A1 | 7/2022 | Eisele et al. | |
| 2022/0306297 | A1 * | 9/2022 | Clucas | B64D 11/02 |
| 2023/0356843 | A1 * | 11/2023 | Brown | B64D 11/02 |
| 2024/0158082 | A1 * | 5/2024 | Ruiz Lara | B64D 11/0023 |
| 2025/0269963 | A1 * | 8/2025 | Moe | B64D 11/02 |

FOREIGN PATENT DOCUMENTS

| | | | | |
|---|---|---|---|---|
| EP | 4023556 | A1 | 7/2022 | |
| WO | 2011101385 | A2 | 8/2011 | |
| WO | 2012110643 | A1 | 8/2012 | |
| WO | WO-2014201397 | A1 * | 12/2014 | B64D 11/02 |

* cited by examiner

200 arranging a lavatory door at a lavatory for an aircraft cabin, the door comprising a door panel and an extension arrangement with at least one vertical extension segment; wherein the door panel is pivotably attached to a lavatory structure on one lateral side such that the door panel is movable around a main vertical axis from a closed position to an opened position; wherein the vertical extension segment is movably mounted to the door panel around a subordinate vertical axis to be movable between a stored position and an extended position ⟍202 moving the door panel in a partly opened position ⟍204 moving the vertical extension segment from the stored position and to the extended position such that a vertically running gap between the door panel and a frame section is covered by the vertical extension segment ⟍206 temporarily fixing the vertical extension segment to the door panel in the extended position; wherein an additional separated space portion is generated that serves as a user space extension of the lavatory compartment ⟍208

Fig. 6

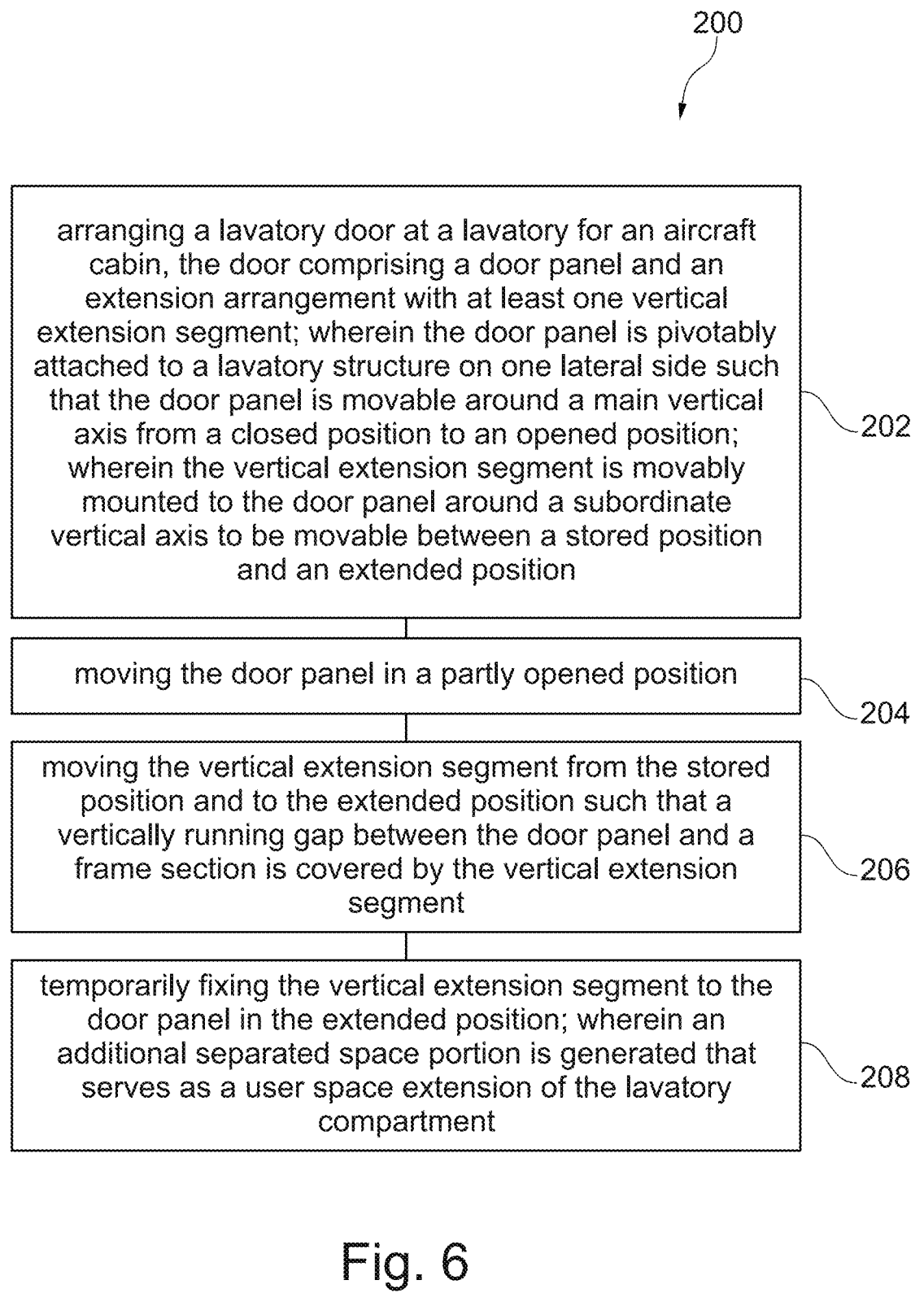

TRANSFORMING LAVATORY DOOR

CROSS-REFERENCES TO RELATED APPLICATIONS

This application claims the benefit of European Patent Application Number 24173071.2 filed on Apr. 29, 2024, the entire disclosure of which is incorporated herein by way of reference.

FIELD OF THE INVENTION

The present invention relates to a transforming lavatory door. In particular, the present invention relates to a lavatory door for an aircraft cabin, to a lavatory arrangement for an aircraft cabin, to a cabin for an aircraft, to an aircraft and to a method for transforming a lavatory arrangement for an aircraft cabin.

BACKGROUND OF THE INVENTION

Lavatories for passengers are installed on board an aircraft to provide sanitary service functions to passengers. In view of space economic concerns, aircraft lavatories are small in order to have maximum space available for passenger seating. However, passengers with reduced mobility (PRMs), in particular when using a wheelchair, may require larger lavatory spaces. In WO 2011/101385 A2, a solution with a movable partition is provided. By moving the partition into an open position, two lavatories are combined to form one larger compartment that can then be used by a PRM. Further, WO 2012/110643 A1 provides a similar solution within a modular design. However, it has been shown that a demand for further improved spatial situations exists.

SUMMARY OF THE INVENTION

There may thus be a need for a lavatory with improved use of available space.

It should be noted that the following described aspects of the invention apply also for the lavatory door for an aircraft cabin, for the lavatory arrangement for an aircraft cabin, for the cabin for an aircraft, for the aircraft and for the method for transforming a lavatory arrangement for an aircraft cabin.

According to the present invention, a lavatory door for an aircraft cabin is provided. The lavatory door comprises a door panel and an extension arrangement with at least one vertical extension segment. The door panel comprises a hinge arrangement on one lateral side such that the door panel is movable around a main vertical axis from a closed position to an opened position. The vertical extension segment is movably mounted in relation to the door panel around a subordinate vertical axis to be movable between a stored position and an extended position. The vertical extension segment is configured to be temporarily fixed in the stored position for a first use of the door panel. For a second use, the vertical extension segment is configured to be moved to the extended position when the door panel is in a partly opened position such that a vertically running gap between the door panel and a door frame is covered by the vertical extension segment.

As an effect, additional space is provided that is still enclosed by the door. This allows the transfer of a lavatory into an enlarged lavatory space, also referred to as extended lavatory space, with rather low constructional effort and additional structural changes and minimal impact for a standard non-extended use.

According to an example, the vertical extension segment is movably mounted to the door panel around the subordinate vertical axis. The vertical extension segment is configured to be temporarily fixed to the door panel in the stored position for a first use of the door panel. In the extended position, the vertical extension segment is configured to be temporarily fixable to the door frame.

According to an example, in addition to the vertical extension segment, the extension arrangement comprises at least one further extension segment configured to cover remaining gap portions in an upper part of the door when the door is in the partly opened position.

According to an example, a horizontally running extension segment is provided that is configured to span a gap between an upper edge of the door panel and the door frame. Further, an inclined running extension segment is provided that is configured to span a gap between an inclined corner section of the door panel and the respectively inclined section of the door frame.

According to the present invention, also a lavatory arrangement for an aircraft cabin is provided. The arrangement comprises at least one lavatory compartment accessible from an aisle area via a door. The door is provided as a lavatory door according to one of the examples above. The door panel opens outwards towards the aisle area and is movable into a partly opened position in which the extension segment is movable into the extended position such that an additional separated space portion is generated that serves as a user space extension of the lavatory compartment.

According to an example, the lavatory arrangement comprises two lavatory compartments that are accessible from an aisle area. Further, a movable partition wall is arranged between the two lavatory compartments. The partition wall is movable between a separating position and a stored position. In the separating position, the partition wall separates the two lavatory compartments from each other; and in the stored position, the partition wall is at least partly removed such that the two lavatory compartments provide a common lavatory. At least one of the two lavatory compartments is provided with the lavatory door according to one of the examples above or below. When the lavatory door is in the partly opened position, the common lavatory together with the user space extension forms an enlarged common lavatory.

According to an example, in the stored position, the partition wall is arranged inside the lavatory arrangement.

According to an example, in the stored position, the partition wall is arranged outside the two lavatory compartments. In the stored position, the partition wall is attached to the lavatory door that is configured for providing the user space extension.

According to an example, one of the two lavatory compartments is designated as primary lavatory with a toilet for the use by a passenger with reduced mobility; the other of the two lavatory compartments is designated as secondary lavatory. The primary lavatory is equipped with the lavatory door that is configured for providing the user space extension. The secondary lavatory comprises a wheelchair parking space next to the lavatory door. For a transfer from a wheelchair to the toilet seat of the primary lavatory, the user space extension provided by the lavatory door of the primary lavatory serves as additional space for accommodating the assisting person during the transfer.

According to an example, the movable partition wall comprises two or more segments pivotably attached to each other such that the wall can be folded along at least one vertical axis. In an option, in the stored position, the movable partition wall is at least partly folded around the non-used toilet.

According to the present invention, also a cabin for an aircraft is provided. The cabin comprises at least one passenger seating zone with a plurality of passenger seats, at least one aisle zone for allowing movement of the passengers inside the cabin and at least one lavatory passenger service unit. The at least one lavatory passenger service unit comprises at least one lavatory arrangement according to one of the examples above.

According to the present invention, also an aircraft is provided. The aircraft comprises a fuselage and a cabin space arranged within the fuselage. In a first option, at least one lavatory arrangement according to one of the examples above is provided within the cabin space. In a second option, a cabin according to one of the examples above is provided within the cabin space.

According to the present invention, also a method for transforming a lavatory arrangement for an aircraft cabin is provided. The method comprises the following steps:

Arranging a lavatory door at a lavatory for an aircraft cabin, the door comprising a door panel and an extension arrangement with at least one vertical extension segment; the door panel is pivotably attached to a lavatory structure on one lateral side such that the door panel is movable around a main vertical axis from a closed position to an opened position; further, the vertical extension segment is movably mounted to the door panel around a subordinate vertical axis to be movable between a stored position and an extended position;

Moving the door panel in a partly opened position;

Moving the vertical extension segment from the stored position and to the extended position such that a vertically running gap between the door panel and a door frame is covered by the vertical extension segment; and Temporarily fixing the vertical extension segment to the door panel in the extended position; an additional separated space portion is generated that serves as a user space extension of the lavatory compartment.

According to an aspect, a lavatory door is provided with extensions such that the door can also act as an enclosure for an extended space when the door is partly opened. This provides added space for a user inside the lavatory. The enclosure function is partly fulfilled by the door panel, also referred to as door leaf, itself, and partly by the additional extensions. When not in use, the extensions are moved away, but still attached ready for use.

According to an aspect, in a standard use case of a dual lavatory unit, a partition wall is separating both lavatories. The wall can thus be referred to as a closed divider wall. The two lavatories can be used independently. In an extended use case for passengers that require a larger lavatory space, e.g., PRMs, the partition wall is opened and no longer separating both lavatories. The wall can thus be referred to as an opened divider wall. The lavatory door leaf is opened and the extending portion(s), e.g., the wing(s), are locked into the door frame. The common lavatory can be used.

As an example, due to cabin lining, the lavatory is chamfered. The cocoon door is provided as a three-wing cocoon door.

In an example, the partition wall is provided as multi-segment wall, e.g., having three foldable wings. The partition wall can be folded around the non-used toilet.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 6 shows basic steps of an example of a method for transforming a lavatory arrangement for an aircraft cabin.

DETAILED DESCRIPTION OF THE PREFERRED EMBODIMENTS

Figure 1:
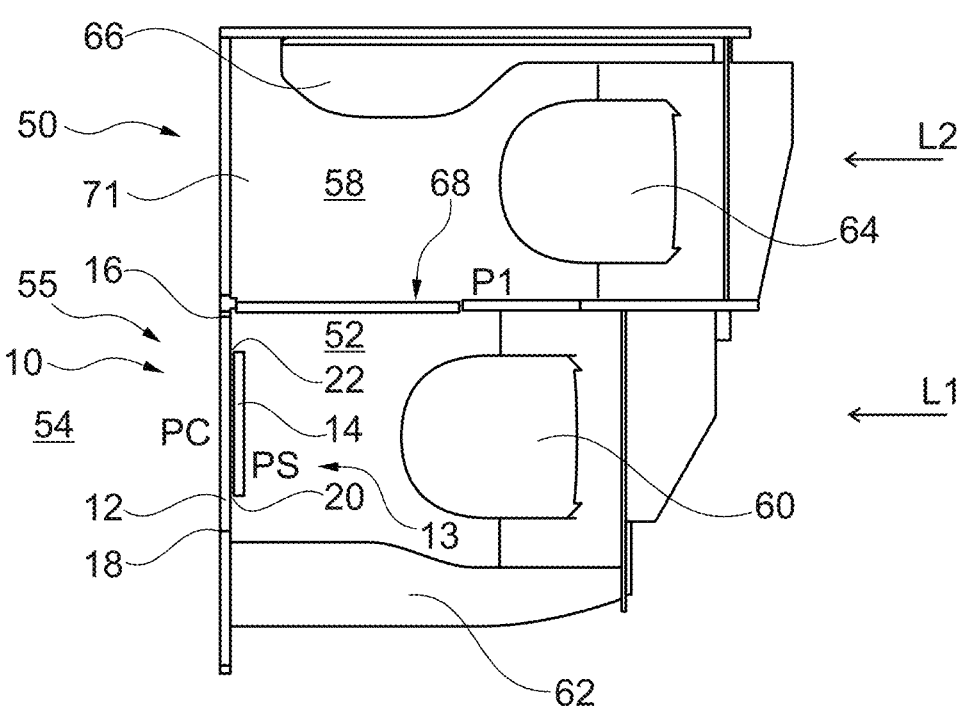
FIG. 1 schematically shows an example of a lavatory door in the context of an example of a lavatory arrangement for an aircraft cabin in a first state of use.

Certain embodiments will now be described in greater detail with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a lavatory door 10 for an aircraft cabin. The door 10 comprises a door panel 12 and an extension arrangement 13 with at least one vertical extension segment 14. The door panel 12 comprises a hinge arrangement on one lateral side such that the door panel 12 is movable around a main vertical axis from a closed position PC to an opened position PO.

As an example, the door of the lower lavatory compartment of FIG. 1 is provided as the lavatory door 10. The door is mounted on its left, i.e., when looking at the door from outside the lavatory compartment, indicated with reference numeral 16, and opens towards the aisle. A door lock can be arranged on the right side of the door, indicated with reference numeral 18.

The vertical extension segment 14 is movably mounted in relation to the door panel 12 around a subordinate vertical axis 20 to be movable between a stored position PS and an extended position PE. The vertical extension segment 14 is configured to be temporarily fixed in the stored position PS for a first use of the door panel 12.

As an example, a latching mechanism 22 is provided for the vertical extension segment 14 on an opposite side to the subordinate vertical axis 20.

A first arrow 21 indicates the pivoting movement of the door panel 12. A second arrow 23 indicates the pivoting movement of the vertical extension segment 14.

For a second use, the vertical extension segment 14 is configured to be moved to the extended position PE when the door panel 12 is in a partly opened position such that a vertically running gap between the door panel 12 and a door frame is covered by the vertical extension segment 14.

The extended door thus provides a spanning angle by the door panel 12 itself and the vertical extension segment 14. These two surfaces partly enclose a space 26.

Figure 2:
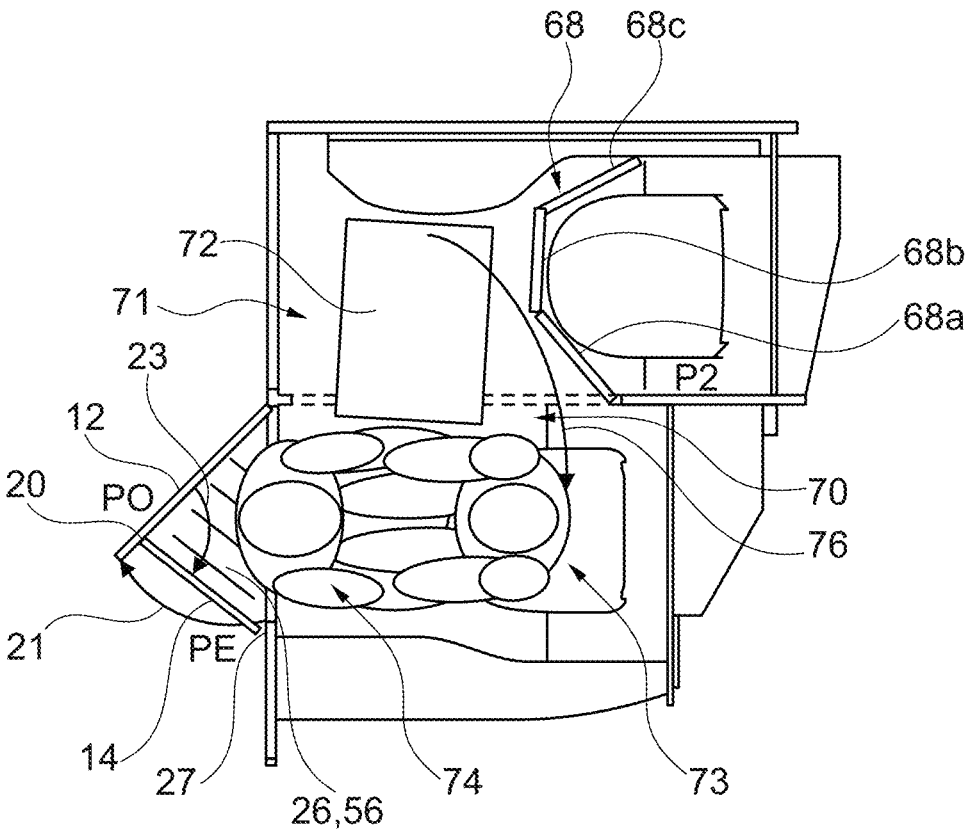
FIG. 2 shows the example of the lavatory door and the lavatory arrangement for an aircraft cabin of FIG. 1 in a second state of use.

FIG. 1 shows the lavatory door 10 in a first state of use. FIG. 2 shows the lavatory door 10 in a second state of use.

The vertical extension segment 14 is referred to as vertical wing or side wing.

The term "lavatory door" relates to a door of a lavatory onboard an aircraft. The door is movably provided to allow entrance and exit to and from a lavatory and to close the lavatory space towards e.g., an aisle or access zone.

The term "door panel" relates to the door leaf. Besides a door panel, also a door frame defining the opening and configured to receive the movable door panel is provided. In the closed state, the door panel 12 provides a function of an enclosure of the space behind the door, i.e., enclosure of the lavatory space.

The term "extension arrangement" relates to additional movable parts arranged to spatially increase the enclosure function.

The term "segment" relates to a separate component or part.

The term "closed position" relates to a state when the opening is covered by the door panel 12 and an entry or exit is blocked by the door panel.

The term "opened position" relates to a state when the opening is not covered by the door panel 12 and the entry or exit is possible.

The term "stored position" relates to a position when the segment is not in use.

The term "opened position" relates to a position when the segment is in use.

The term "first use" relates to one type of use, in this case the use of the door as a door without the extension. The term "second use" relates to another type of use, in this case the use of the door as a space extender with the extension, e.g., for PRM support.

The term "hinge connection" relates to a connection allowing a movement around a vertical axis.

The term "gap" relates to a non-covered part, e.g., where an enclosure function is not provided.

The door panel 12 is provided as a bi-functional door panel, since it provides a first function of opening and closing an access for the space of the respective lavatory compartment, and a second function of providing additional, but still enclosed space. The door is being able to achieve two states fulfilling two different purposes.

In an option, the vertical extension segment 14 is movably mounted to the door panel 12 around the subordinate vertical axis 20. The vertical extension segment 14 is configured to be temporarily fixed to the door panel 12 in the stored position PS for a first use of the door. In the extended position PE, the vertical extension segment 14 is configured to be temporarily fixable to the door frame 27.

In an alternative solution, the vertical extension segment 14 is movably mounted to the door frame around the subordinate vertical axis. The vertical extension segment 14 is configured to be temporarily fixed to the door frame in the stored position for a first use of the door panel 12. In the extended position, the vertical extension segment is configured to be temporarily fixable to the door panel 12.

Figure 3:
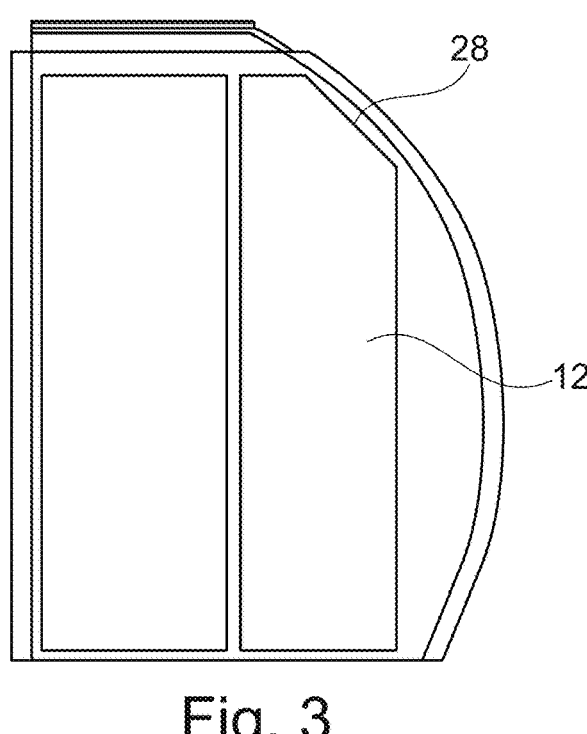
FIG. 3 shows an exterior view of the lavatory arrangement of FIG. 1 with the lavatory door in a first, closed state.

FIG. 3 shows an exterior view of the door 10 in the context of the lavatory arrangement (also see below) of FIG. 1 with the lavatory door 10 in a first, closed state.

Figure 4:
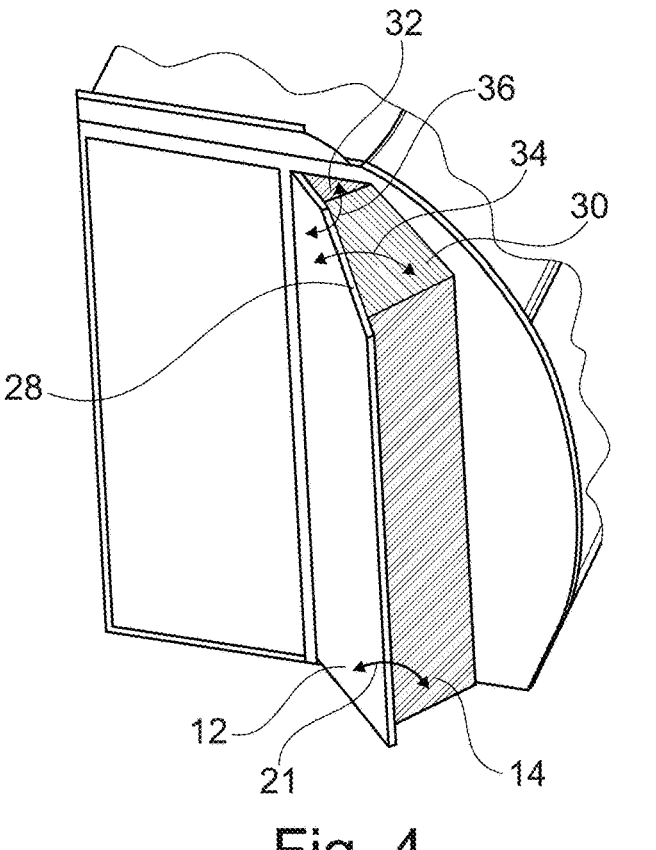
FIG. 4 shows an exterior view of the lavatory arrangement of FIG. 2 with the lavatory door in a second, extended state.

FIG. 4 shows an exterior view of the door 10 in the context of the lavatory arrangement (also see below) of FIG. 2 with the lavatory door 10 in a second, extended state.

In an option, the lavatory door panel 12 is having a chamfered upper edge 28, due to the curved form of the cabin interior wall when arranging the lavatory and thus also the door close to the lateral side wall, e.g., in a snugly fit manner.

In an option, in addition to the vertical extension segment 14, the extension arrangement 13 comprises at least one further extension segment configured to cover remaining gap portions in an upper part of the door when the door 10 is in the partly opened position.

As an option, the extension arrangement 13 also comprises an inclined running extension segment 30 configured to span a gap between an inclined, i.e., the chamfered, corner section of the door panel 12 and the respectively inclined section of the door frame.

The inclined running extension segment 30 is referred to as transition wing or inclined wing.

As another option, in addition or instead, the extension arrangement 13 also comprises a horizontally running extension segment 32 configured to span a gap between an upper edge of the door panel 12 and the door frame.

The horizontally running extension segment 32 is referred to as top wing or horizontal wing.

The term "upper part" relates to a part near the upper edge when the door is in its mounted and used state.

A third arrow 34 indicates the pivoting movement of the inclined running extension segment 30; a fourth arrow 36 indicates the pivoting movement of the horizontally running extension segment 32.

Referring back to FIG. 1 and FIG. 2, also a lavatory arrangement 50 for an aircraft cabin (also see FIG. 5) is provided. The lavatory arrangement 50 comprises at least one lavatory compartment 52 accessible from an aisle area 54 via a door 55. The door is provided as an example of the lavatory door 10 according to one of the examples above. The door panel opens outwards towards the aisle area 54 and is movable into a partly opened position in which the extension segment 14 is movable into the extended position PE such that an additional separated space portion 56 is generated that serves as a user space extension of the lavatory compartment 52.

The term "lavatory arrangement" relates to a part inside the cabin that is arranged for providing sanitary service functions. In an example, the lavatory arrangement relates to a monument housing one or more lavatories placed within the cabin. In another example, the lavatory arrangement relates to a part of the cabin separated from other zones with interior constructions housing one or more lavatories.

The term "lavatory compartment" relates to the actual space of the lavatory. For example, if the lavatory provides a toilet, the lavatory compartment can be referred to as toilet compartment or toilet space. The lavatory arrangement can comprise one or several lavatory compartments.

The term "aisle" area relates to space in the cabin used for passenger and crew movement in the cabin. The aisle area relates to the main aisles commonly arranged in longitudinal direction of an aircraft, for example one or two or more aisles separating the two or more seating zones. The aisle area also relates to the aisle sections in transverse direction, connecting different main aisles or providing access to the aircraft doors, to galley sections and lavatories, the cockpit door, and also internal staircases on board the aircraft.

The lavatory door configured for providing the user space extension can also be referred to as extendable lavatory door or cocoon door.

The space extension is provided, for example, for use by passengers with reduced mobility (PRM) or other passengers that need assistance during use of the lavatory, such as smaller children accompanied by their parents for support. The space extension can be used by an assisting person.

The term "lavatory compartment" relates to an enclosed space having installations of a lavatory such as a toilet, a urinal, a sink, a mirror or a waste bin. The lavatory compartment can also be referred to as lavatory, toilet room, restroom or passenger service room. The lavatory compartment can also be referred to as toilet space.

The term "aisle area" relates to parts of the cabin provided for access by passengers and crew, movement onboard of passengers and crew, movement of service units like trolleys for onboard service. The aisle area is usually adjacent to seating areas having passenger seats. The aisle area can also be referred to as corridor arrangement.

The term "user space extension" relates to an added space portion increasing the available space.

The space extension is provided as a private space.

In an option, the lavatory arrangement 50 comprises two lavatory compartments 52, 58 accessible from the aisle area 54.

In an option, one of the two lavatory compartments 52, 58 is designated as primary lavatory L1 with a toilet 60 for the use by a passenger with reduced mobility. The other of the two lavatory compartments is designated as secondary lavatory L2.

The primary lavatory L1 further comprises a sink or washbasin 62. The secondary lavatory L2 may also be provided with a toilet 64 and a sink or washbasin 66. In an option, secondary lavatory L2 is equipped with a urinal in addition or instead of the toilet. Further, instead of the sinks within the lavatory compartment, also a common sink can be provided, separately arranged.

A movable partition wall 68 is arranged between the two lavatory compartments. The partition wall 68 is movable between a separating position P1 and a stored position P2. In the separating position P1, the partition wall 68 separates the two lavatory compartments 52, 58 from each other; in the stored position P2, the partition wall 68 is at least partly removed such that the two lavatory compartments 52, 58 provide a common lavatory 70. At least one of the two lavatory compartments is provided with the lavatory door 10 according to one of the examples above. When the lavatory door 10 is in the partly opened position, the common lavatory 70 together with the user space extension 56 forms an enlarged common lavatory.

In the example shown, the primary lavatory L1 is equipped with the lavatory door 10 that is configured for providing the user space extension. Further, the secondary lavatory L2 comprises a wheelchair parking space 71 next to the lavatory door. For a transfer from a wheelchair 72 to the toilet seat of the toilet 60 of the primary lavatory L1, the user space extension 56 provided by the lavatory door 10 of the primary lavatory L1 serves as additional space for accommodating an assisting person 74 during the transfer of a person 73 in the wheelchair 72. The transfer movement is indicated with a fifth arrow 76.

In FIG. 1 and FIG. 2, the lower lavatory compartment is the designated primary lavatory L1.

The partition wall 68 can also be referred to as separation wall or divider wall.

In an option, the partition wall is provided with a sliding mechanism inside the lavatory compartment or is pivotably supported inside the lavatory compartment.

In an example, the lavatory door opens to the outside, i.e., towards the aisle area.

As an option, the lavatory door opens such that in view of a possible emergency situation, the door does not open against a stream of evacuating passengers such that these run into the obstructing door. Rather, the door opens in direction of stream of passengers such that these would re-close the lavatory door.

The term "separating position" relates to a first or main position of the partition wall for the use of the lavatories. The separating position can also be referred to as the dual-toilet use position.

The term "stored position" relates to a second or auxiliary position for the use of the lavatories. The secondary position can also be referred to as the PRM-toilet use position.

The term "common lavatory" relates to the enlarged toilet space in which both toilets are enclosed, but only one is actually usable.

As an example, the enlarged common lavatory is provided for the use by passengers with reduced mobility.

The term "partition wall" relates to a wall separating the spaces of the first lavatory compartment and the second lavatory compartment, i.e., of the first and second toilet spaces.

The enlarged common lavatory is configured for the use of the lavatory by passengers with reduced mobility (PRM), e.g., passengers that are using a wheelchair. For the use of a lavatory by a PRM, a transfer from the wheelchair onto a toilet seat and from there back to the wheelchair must be possible. Besides additional handles and grip portions throughout the cabin, also more space must be provided for this use scenario. For the further use of a lavatory by a PRM, also space for a support person may be needed.

In order to save space, the lavatory compartments are configured for standard use, allowing minimal space occupying layouts. However, these are too small for use by PRMs. For providing larger lavatory compartments that are suitable for being used by PRMs, two lavatory compartments are combined by removing the partition wall. Instead of folding and storing the wall inside the lavatory, the wall is moved out of the lavatory compartment and fixed in a different position. Thus, the space available inside the lavatory compartment is maximized.

The enlarged common lavatory allows the use of a wheelchair. Further, also space for a support person is provided by the enlarged common lavatory.

In an option, at least one of the first and second lavatory compartments comprises a toilet.

In one example, the first lavatory compartment comprises a toilet; the second lavatory compartment may comprise another facility like a sink, a urinal, a table or the like.

In another example, the first lavatory compartment comprises a toilet and the second lavatory compartment also comprises a toilet.

In addition, the first or the second lavatory compartment or both the first lavatory compartment and the second lavatory compartment comprise a sink in addition. In an option, a urinal can be provided in addition to a toilet, in one or both of the first and second lavatory compartment.

In an example, the lavatory arrangement comprises a first lavatory compartment accessible from an aisle area via a first door; and a second lavatory compartment accessible from the aisle area via a second door. The movable partition wall is arranged between the first lavatory compartment and the second lavatory compartment. The partition wall is movable between the separating position and the stored position. In the separating position, the partition wall separates the first lavatory compartment from the second lavatory compartment, and in the stored position, the partition wall is at least partly removed such that the first lavatory compartment and the second lavatory compartment provide the common lavatory. At least one of the first door and the second door is provided as the lavatory door according to one of the examples above. When the lavatory door is in the partly opened position, the common lavatory together with the user space extension forms the enlarged common lavatory.

As an example, the enlarged common lavatory is provided for the use by passengers with reduced mobility.

As an advantage, more space is gained that is provided for an assist person during the PRM transfer from the wheelchair to the toilet seat.

The present solution aims on lavatory doors for passengers with reduced mobility (PRM). The examples described herein are suitable for new lavatory installations. However, the examples described herein are also suitable for retrofitting existing cabin structures or even retro-fitting existing lavatories.

The lavatory door with the attached movable extension provides extra space in enclosing manner. The lavatory door with the attached movable extension can also be referred to as "cocoon door". The cocoon feature gains additional space for the assist person in case of PRM use of the lavatory.

As an example, three additional blades, which are located (folded) on the inside of a single blade door, are creating an additional enclosed space, like a cocoon, by unfolding into a specified position. The gained area is privacy protected and offers additional space for an assist person. Three blades are of advantage, e.g., for lavatories next to a cabin wall in the rear section of an aircraft, because the respectively affected lavatories are usually located in the conical aft area of the aircraft which results in the lavatory door to be chamfered. The material of the blades is not necessarily rigid, also a fabric could be used or a combination of rigid and flexible blades.

A technical and also economic benefit is that the lavatory can have an appropriate interior size for typical passenger use, but can also be extended slightly for assisted PRM use. Cabin operation is not disturbed during normal use, only for the time of a PRM operation, the space, e.g., for trolley maneuver is slightly reduced. This allows an airline operator to offer a fully assisted PRM solution compliant with the respective rating regulations, but without affecting the current footprint or cabin layouts.

The solution creates additional space for an assist person, who could be needed during a PRM transfer from the wheelchair to the toilet seat. The solution creates this additional space by unfolding, e.g., three blades which are located and folded (in stored position) on the inside of a flat single blade door.

In an example, only one of the two lavatory compartments is provided with the lavatory door according to one of the examples above.

In another example, both of the two lavatory compartments are provided with the lavatory door according to one of the examples above.

In an option, in the stored position, the partition wall 68 is arranged inside the lavatory arrangement, e.g., inside the secondary lavatory compartment L2.

In another option (not shown), in the stored position, the partition wall 68 is arranged outside the two lavatory compartments. In the stored position P2, the partition wall 68 is attached to the lavatory door that is configured for providing the user space extension.

In an example, for the stored position, the partition wall is at least partly pulled out of the lavatory arrangement, pivoted or folded and temporarily fixed to the outside of the lavatory door configured for providing the user space extension.

In an option, the lavatory arrangement is configured for being located in the rear of an aircraft and at an aisle section transverse to a longitudinal direction of an aircraft. One of the lavatory compartments is an outer lavatory compartment configured to be arranged next to an inner wall of the aircraft. The outer lavatory compartment is the designated primary lavatory compartment.

In an example, the outer lavatory compartment has a shorter length. For example, both lavatory compartments have a toilet and both toilets are approximately arranged in flight direction.

In an option, as shown in FIG. 2, the movable partition wall 68 comprises two or more segments 68a, 68b, 68c pivotably attached to each other such that the wall can be folded along at least one vertical axis. In an option, in the stored position P2, the movable partition wall 68 is at least partly folded around the non-used toilet of the secondary lavatory compartment L2.

Figure 5:
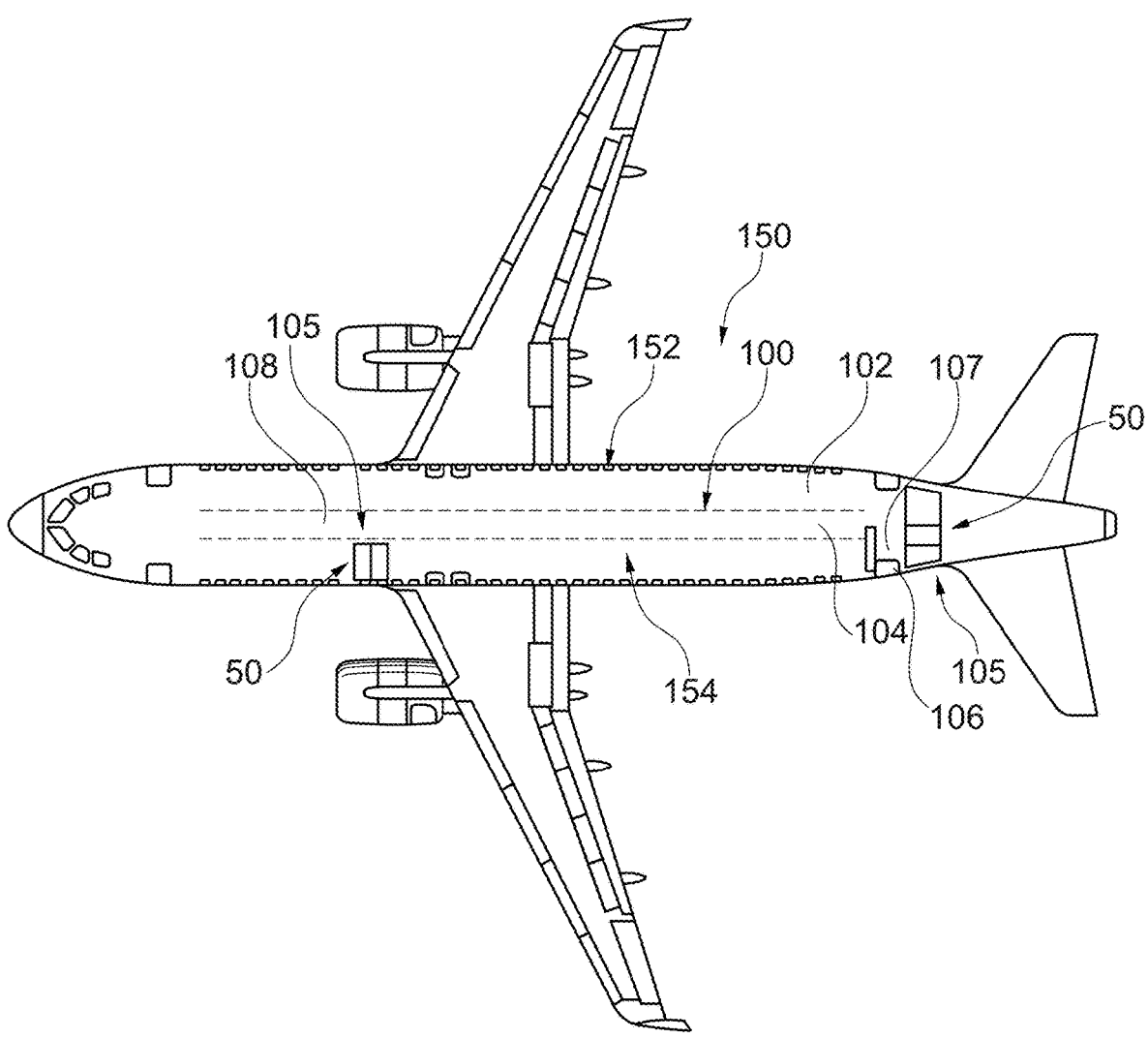
FIG. 5 shows an example of a cabin in an aircraft.

FIG. 5 shows an example of a cabin 100 in an aircraft. The cabin 100 comprises at least one passenger seating zone 102 with a plurality of passenger seats. The cabin 100 further comprises at least one aisle zone 104 for allowing movement of the passengers inside the cabin. The cabin 100 also comprises at least one lavatory passenger service unit 105. The at least one lavatory passenger service unit comprises at least one lavatory arrangement according to one of the examples above.

The term "passenger seating zone" relates to the parts of the cabin in which seats are provided for passengers.

The term "aisle zone" relates to the parts of the cabin that act as corridors for movement onboard the aircraft.

The term "lavatory passenger service unit" relates to monuments and other arrangements in the cabin providing the restroom functions onboard the aircraft.

In an option, the at least one aisle zone comprises an entry zone provided to be arranged next to an aircraft door 106. The entry zone comprising an entry aisle area 107. The lavatory arrangement is accessible from the entry aisle area 107.

In another option, provided in addition or instead, the at least one aisle zone 104 comprises at least one longitudinally arranged aisle 108. The lavatory arrangement is accessible from the aisle 108.

FIG. 5 also shows an example of an aircraft 150. The aircraft 150 comprises a fuselage 152 and a cabin space 154 arranged within the fuselage 152. In a first option, at least one lavatory arrangement 50 according to one of the examples above is provided within the cabin space 154. In a second option, a cabin 100 according to one of the examples above is provided within the cabin space 154.

FIG. 6 shows basic steps of an example of a method 200 for transforming a lavatory arrangement for an aircraft cabin. The method 200 comprises the following steps:

In a first step 202, a lavatory door is arranged at a lavatory for an aircraft cabin. The door comprises a door panel and an extension arrangement with at least one vertical extension segment. The door panel is pivotably attached to a lavatory structure on one lateral side such that the door panel is movable around a main vertical axis from a closed position to an opened position. The vertical extension segment is movably mounted to the door panel around a subordinate vertical axis to be movable between a stored position and an extended position.

In a second step 204, the door panel is moved in a partly opened position.

In a third step 206, the vertical extension segment is moved from the stored position to the extended position such that a vertically running gap between the door panel and a door frame is covered by the vertical extension segment.

In a fourth step 208, the vertical extension segment is temporarily fixed to the door panel in the extended position. An additional separated space portion is generated that serves as a user space extension of the lavatory compartment.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lavatory door for an aircraft cabin, the lavatory door comprising:

a door panel;

a door frame surrounding the door panel and configured to receive the door panel; and an extension arrangement with at least one vertical extension segment, a horizontally running extension segment configured to span a gap between an upper edge of the door panel and the door frame, and an inclined running extension segment configured to span a gap between an inclined corner section of the door panel and a respectively inclined section of the door frame;

wherein the door panel comprises a hinge arrangement on one lateral side configured to attach to the door frame such that the door panel is movable around a main vertical axis from a closed position to an opened position;

wherein the extension arrangement is movably mounted in relation to the door panel around a subordinate vertical axis to be movable between a stored position and an extended position;

wherein the extension arrangement is configured to be temporarily fixed in the stored position for a first use of the door panel such that an interior space of the lavatory door is unimpeded; and wherein, for a second use, the extension arrangement is configured to be moved to the extended position when the door panel is in a partly opened position such that a vertically running gap between the door panel and the door frame is covered by the vertical extension segment.

2. The lavatory door according to claim 1, wherein the vertical extension segment is movably mounted to the door panel around the subordinate vertical axis;

wherein the vertical extension segment is configured to be temporarily fixed to the door panel in the stored position for a first use of the lavatory door; and wherein, in the extended position, the vertical extension segment is configured to be temporarily fixable to the door frame.

3. The lavatory door according to claim 1, wherein, in addition to the vertical extension segment, the extension arrangement comprises at least one further extension segment configured to cover remaining gap portions in an upper part of the lavatory door when the lavatory door is in the partly opened position.

4. A lavatory arrangement for an aircraft cabin, the lavatory arrangement comprising:

a lavatory compartment accessible from an aisle area via a door;

wherein the door is provided as a lavatory door according to claim 1 such that in the stored position, the lavatory compartment is unimpeded; and wherein the door panel opens outwards towards the aisle area and is movable into a partly opened position in which the vertical extension segment is movable into the extended position such that an additional separated space portion is generated that serves as a user space extension of the lavatory compartment.

5. An aircraft, comprising:

a fuselage; and a cabin space arranged within the fuselage;

wherein provided within the cabin space is at least one lavatory arrangement according to claim 4.

6. The lavatory arrangement according to claim 4, wherein the lavatory arrangement comprises:

a second lavatory compartment also accessible from the aisle area; and a movable partition wall arranged between the two lavatory compartments;

wherein the partition wall is movable between a separating position and a stored position;

wherein in the separating position, the partition wall separates the two lavatory compartments from each other, and in the stored position, the partition wall is at least partly moved such that the two lavatory compartments provide a common lavatory;

wherein at least one of the two lavatory compartments is provided with the lavatory door; and wherein, when the lavatory door is in the partly opened position, the common lavatory together with the user space extension forms an enlarged common lavatory.

7. The lavatory arrangement according to claim 6, wherein in the stored position, the partition wall is arranged inside the lavatory arrangement.

8. The lavatory arrangement according to claim 6, wherein in the stored position, the partition wall is attached to the lavatory door that is configured for providing the user space extension.

9. The lavatory arrangement according to claim 6, wherein one of the two lavatory compartments is designated as a primary lavatory with a toilet for use by a passenger with reduced mobility; and another of the two lavatory compartments is designated as secondary lavatory;

wherein the primary lavatory is equipped with the lavatory door that is configured for providing the user space extension;

wherein the secondary lavatory comprises a wheelchair parking space next to the lavatory door; and wherein for a transfer from a wheelchair to a toilet seat of the primary lavatory, the user space extension provided by the lavatory door of the primary lavatory serves as additional space for accommodating an assisting person during the transfer.

10. The lavatory arrangement according to claim 6, wherein the movable partition wall comprises two or more segments pivotably attached to each other such that the partition wall can be folded along at least one vertical axis; and wherein, in the stored position, the movable partition wall is at least partly folded around an un-used toilet in one of the two lavatory compartments.

11. A cabin for an aircraft, the cabin comprising:

at least one passenger seating zone with a plurality of passenger seats;

at least one aisle zone for allowing movement of passengers inside the cabin; and at least one lavatory passenger service unit;

wherein the at least one lavatory passenger service unit comprises at least one lavatory arrangement according to claim 4.

12. The cabin according to claim 11, wherein the at least one aisle zone comprises at least one longitudinally arranged aisle; and wherein the lavatory arrangement is accessible from the at least one longitudinally arranged aisle.

13. The cabin according to claim 11, wherein the at least one aisle zone comprises an entry zone provided to be arranged next to an aircraft door;

wherein the entry zone comprises an entry aisle area; and wherein the lavatory arrangement is accessible from the entry aisle area.

14. An aircraft, comprising:

a fuselage; and a cabin space arranged within the fuselage;

wherein provided within the cabin space is a cabin according to claim 11.

15. A method for transforming a lavatory arrangement for an aircraft cabin, comprising the following steps:

arranging a lavatory door at a lavatory compartment for an aircraft cabin, the lavatory door comprising a door panel, a door frame surrounding the door panel and configured to receive the door panel, and an extension arrangement with at least one vertical extension segment, a horizontally running extension segment configured to span a gap between an upper edge of the door panel and the door frame, and an inclined running extension segment configured to span a gap between an inclined corner section of the door panel and a respectively inclined section of the door frame; wherein the door panel is pivotably attached to a lavatory structure on one lateral side such that the door panel is movable around a main vertical axis from a closed position to an opened position; wherein the extension arrangement is movably mounted to the door panel around a subordinate vertical axis to be movable between a stored position and an extended position, such that in the stored position, an interior space of the lavatory door is unimpeded;

moving the door panel in a partly opened position;

moving the extension arrangement from the stored position to the extended position such that a vertically running gap between the door panel and the door frame is covered by the vertical extension segment; and temporarily fixing the extension arrangement to the door panel in the extended position; wherein an additional separated space portion is generated that serves as a user space extension of the lavatory compartment.

* * * * *